US006856430B1

(12) United States Patent
Gase

(10) Patent No.: US 6,856,430 B1
(45) Date of Patent: Feb. 15, 2005

(54) CALCULATION OF TONER USAGE

(75) Inventor: Stephen T. Gase, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 891 days.

(21) Appl. No.: 09/698,429

(22) Filed: Oct. 26, 2000

(51) Int. Cl.[7] ................................................ G06K 15/00
(52) U.S. Cl. ...................... 358/1.9; 358/1.13; 358/1.15; 399/27; 399/49; 399/61
(58) Field of Search ........................ 399/49, 61, 24–30; 358/1.1–1.9, 1.11–1.18

(56) References Cited

U.S. PATENT DOCUMENTS

| | | | | |
|---|---|---|---|---|
| 5,802,420 A | * | 9/1998 | Garr et al. | 399/27 |
| 5,825,986 A | * | 10/1998 | Ferguson | 358/1.9 |
| 5,937,225 A | * | 8/1999 | Samuels | 399/27 |
| 5,970,275 A | * | 10/1999 | Brown et al. | 399/27 |
| 6,356,359 B1 | * | 3/2002 | Motamed | 358/1.8 |
| 6,741,268 B1 | * | 5/2004 | Hayakawa | 345/777 |
| 2004/0070788 A1 | * | 4/2004 | Barry et al. | 358/1.15 |

* cited by examiner

*Primary Examiner*—King Y. Poon
(74) *Attorney, Agent, or Firm*—Leslie G. Murray

(57) ABSTRACT

A method and apparatus which generates a copy of the print data file for a print job and utilizes the copied data file to calculate the amount of marking material required to print the print job while allowing the processing of the print job to proceed without interruption or delay. A print server in a computer or printing system receives print jobs originating at one or more host computers. At the print server the print job data file is copied and a separate task using the copy calculates the amount of marking material required to print the print job proceeds in the print server background in parallel with the conventional processing of the print job. The print job file is converted to a universal file format prior to being transmitted to the print server. Once the print job in universal file format is copied for the task of calculating the amount of marking material required to print the print job, the universal file format file is converted to a page description language file prior to print job processing and transmission to an imaging device.

5 Claims, 4 Drawing Sheets

CALCULATION OF TONER USAGE

FIELD OF THE INVENTION

The present invention relates generally to image-forming apparatus such as printers, and, more particularly, to the calculation of the amount of ink or toner required to print a page or document.

BACKGROUND OF THE INVENTION

A typical image-forming apparatus such as a printer or a copier that uses electrophotographic, ionographic, or magnetographic technologies frequently uses dry powder toner development of an intermediate image created in the image-forming process. Similarly, a printer or other image-forming apparatus that uses thermal inkjet or other liquid ink technologies uses liquid ink to directly form an image on a selected medium. With any of these image-forming technologies, a supply of powder toner or liquid ink is stored in a reservoir from which it is delivered to the image-forming apparatus.

For the case of electrophotographic printing, for example, a photoconductor drum is first electrostatically charged. The photoconductor drum is then exposed to an image light pattern, such as that generated by a laser source, for example, which selectively discharges regions on the previously charged photoconductor drum. The photoconductor drum is developed by delivering electrostatically charged toner particles to the surface of the drum where the charged particles selectively adhere to appropriately charged regions of the drum to form an image corresponding to the image light pattern. The electrostatically transferred toner image is then transferred to paper or other print media and is thermally fused to the paper. Any residual toner is cleaned from the surface of the photoconductor drum prior to reinitiating of the image-forming process. Such a process is applicable to color as well as monochrome printers.

According to the above steps, it is clear that an adequate supply of media marking material such as toner or ink is critical. A lack of toner or ink can result in the onset of unacceptable print quality with consequential waste of resources, such as print media, while the unacceptable quality printing continues. Of course, a lack of toner or ink may also result in a suspension of the print job until the supply of toner or ink is replenished.

Users appreciate knowing the amount of consumable supplies available in a printing device, marking material, for example, especially prior to starting a print or copy job. This is particularly true in the case of a remote printing device in which the user is working at a host computer that is connected via some type of network to the remote printing device. Additionally, it is highly desirable to know and be able to track the amount of marking material consumed, not only on a per printed page or job, but also for a particular imaging apparatus or individual user or users. A user is, typically, unaware of the amount or condition of the consumable supplies, such as toner or ink, available to the printing device prior to sending a print job. A frequent result of this unawareness is finding that the printing device ran out of ink or toner, or other consumable supply, in the middle of a print job at the time the user goes to the printing device to collect the print job. Typically, this results in a waste of both time and resources as the entire print job has to be printed a second time after the printing device has been replenished with the appropriate consumable supplies.

Most printers, copiers, and other imaging devices include the capability to measure or track and report consumable supplies such as ink or toner. Typically, an imaging device incorporates a monitoring or measuring device or sensor to detect and report the toner level in a toner cartridge. Additionally, some imaging devices include the capability to estimate or calculate the amount of marking material used or required to print an image. Typically, an imaging device operates by marking or not marking in a grid pattern of image elements, each element of the grid being referred to as a pel or sometimes as a pixel. It is known to count the number of pels at which toner or ink is printed and the usage of marking material being determined from the number of pels counted. The amount of the beginning or full supply of marking material is known and an estimated remaining marking material is that amount calculated by subtracting the estimated usage.

For conventional imaging devices, such as printers and printer networks, in which the marking material usage is calculated, the calculation is typically performed prior to or during the printing of the print job. In most cases, this calculation can delay or interrupt one or more of the various processing tasks associated with printing the print job. These delays and interruptions can increase the time required to complete a print job thereby decreasing the printer efficiency and production. Additionally, in some printers, toner usage may be measured directly by gauges or sensors coupled directly to the toner or ink cartridge or reservoir. While providing useful information, the amount of toner used for a particular print job is calculated after the fact and is based on a relatively inaccurate measurement of toner remaining in the reservoir.

Accordingly, there is a need for a method of calculating the amount of marking material required to print a print job that provides accurate, advance information and that does not significantly increase the amount of time required to complete the print job.

SUMMARY OF THE INVENTION

In a preferred embodiment, the present invention provides a method and apparatus which generates a copy of the print data file for a print job and utilizes the copied data file to calculate the amount of marking material required to print the print job while allowing the processing of the print job to proceed without interruption or delay. The method according to the present invention is preferably implemented in a computer or printing system wherein print jobs originating at one or more host computers are transmitted to a print server where a portion of or all of the print data processing is completed prior to further transmitting the processed print data to a selected imaging device in the printing system. At the server the print job data file is copied and the task of calculating the amount of marking material required to print the print job proceeds in the server background in parallel with the conventional processing of the print job. In another preferred embodiment, the print job is converted to a universal file format prior to being transmitted to the server. A copy of the universal file format file is then used to calculate the amount of marking required to print the print job. Use of a universal file format eliminates the need to update the marking material required calculation logic every time a specific printer page description language (PDL) is updated.

In a preferred embodiment, the present invention may be implemented as a method for calculating the amount of marking material required to print a print job. The method preferably includes transmitting a print data file for a print job to a print server and generating a copy of the print data file. As a first task, the print server continues the conventional processing of the print job including at least the selection of an image-forming device for the print job and transmitting the print job to the selected image-forming device. As a second, separate task, running in the server background, utilizing the copy of the print job to calculate the amount of marking material required to print the print job. Essentially, calculation of the amount of marking material, such as toner, required to print a print job involves counting the number of image elements (pels) defining the print job and multiplying a known amount of marking material required to print an individual image element by the number of image elements contained in the print job. The calculation of the amount of marking material required utilizes the print data file copy and includes converting the print data file to a raster data file, counting the number of pels in the resulting bit map image contained in the print job, and calculating the amount of marking material required to print the print job using a known amount of marking material for printing an individual pel.

In another preferred embodiment, the present invention may be implemented as a method for calculating the amount of marking material required to print a print job wherein the method preferably includes converting the print job at a host or client computer to a universal file format file, such as Portable Document Format (PDF), for example, prior to transmitting the print job data file to a print server. At the print server, the universal file format file is copied and the copy is then used in a separate task running in the server background to calculate the amount of toner required to print the print job. As a first task, the server firstly converts the universal file format file to a page description language (PDL) file, and then continues the conventional processing of the print job including at least the selection of an image-forming device for the print job and transmitting the print job to the selected image-forming device. As a second task, the amount of toner required to print the print job includes converting the universal file format file to raster data, counting the number of pels in the resulting bit map image for the print job, and calculating the amount of marking material required to print the print job using a predetermined amount of marking material for printing an individual pel.

Other embodiments and advantages of the present invention will be readily appreciated as the same become better understood by reference to the following detailed description, taken in conjunction with the accompanying drawings. The claims alone, not the preceding summary or the following detailed description, define the invention.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the following detailed description illustrate by way of example the principles of the present invention. The components in the drawings are not necessarily to scale, emphasis instead being placed upon clearly illustrating the principles of the present invention. In the drawings like reference numbers indicate identical or functionally similar elements throughout the several views thereof, and wherein.

DETAILED DESCRIPTION OF THE INVENTION

Figure 1:
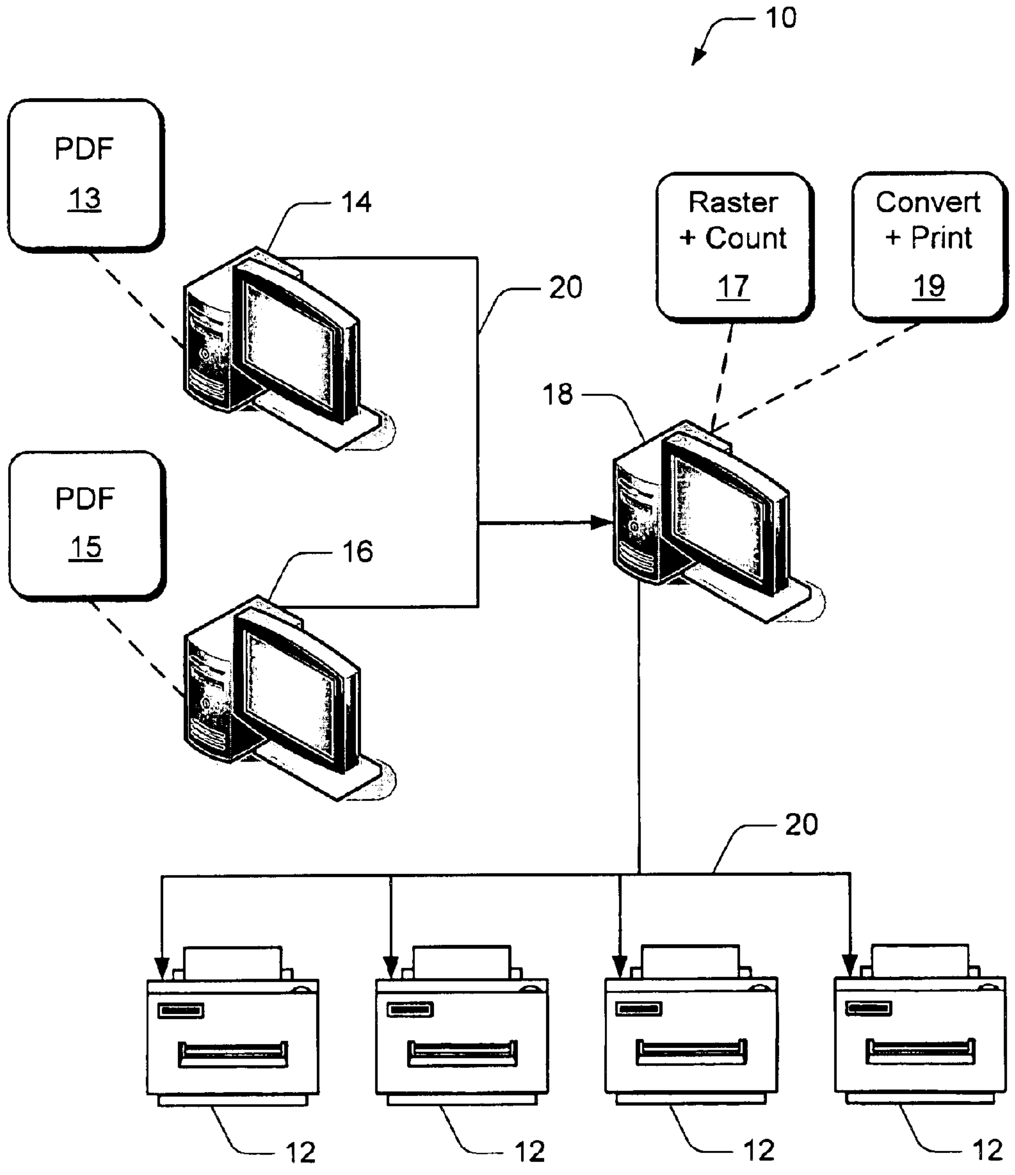
FIG. 1 is a schematic block diagram of a network operating environment having a print server adapted to carry out the present invention and coupled to one or more host computers and printers.

As shown in the drawings for purposes of illustration, the present invention is preferably embodied in a print server which generates a copy of the print data file for a print job and utilizes the copied data file to calculate the amount of marking material required to print the print job while allowing the processing of the print job to proceed without interruption or delay. At the server, the task of calculating the amount of marking material required to print the print job proceeds in the server background in parallel with the conventional processing of the print job.

Referring now to FIG. 1, a computer network environment 10 including one or more image-forming devices 12 remotely coupled to one or more host computers 14 and 16 via a network or print server 18 over a communications network 20 is shown. The print server 18 is adapted to receive print jobs from the host computers over the communications network 20 and further distribute the print jobs to an appropriate image-forming device 12. For the purposes of this disclosure, the image-forming device 12 is in the form of a laser printer 12 that employs an electrophotographic drum imaging system, as well known in the art. However, as will be obvious to those of ordinary skill in the art, the present invention is similarly applicable to other types of printers and/or imaging devices including, for example, inkjet printers, facsimile machines, copiers, or the like. In a preferred embodiment, the communications network 20 is in the form of a local area network (LAN). Host computers 14, 16, print server 18, and laser printer(s) 12 can be connected together via JETADMIN LAN Ethernet connections available from Hewlett-Packard Company. Preferably, corresponding hardware includes a JetDrive multiprotocol EIO, which is an Ethernet card that spools out print jobs from the network 20 and is available from Hewlett-Packard Company. However, in other embodiments, the communications network 20 may be a wide area network (WAN) or the Internet, for example, via which a host computer may be directly connected to a printing device. Any one of the host computers 14 and 16 can send a print job to the print server 18. The print server 18 includes one or more printer drivers (not shown) for formatting print jobs for delivery to an appropriate printer 12.

Figure 2:
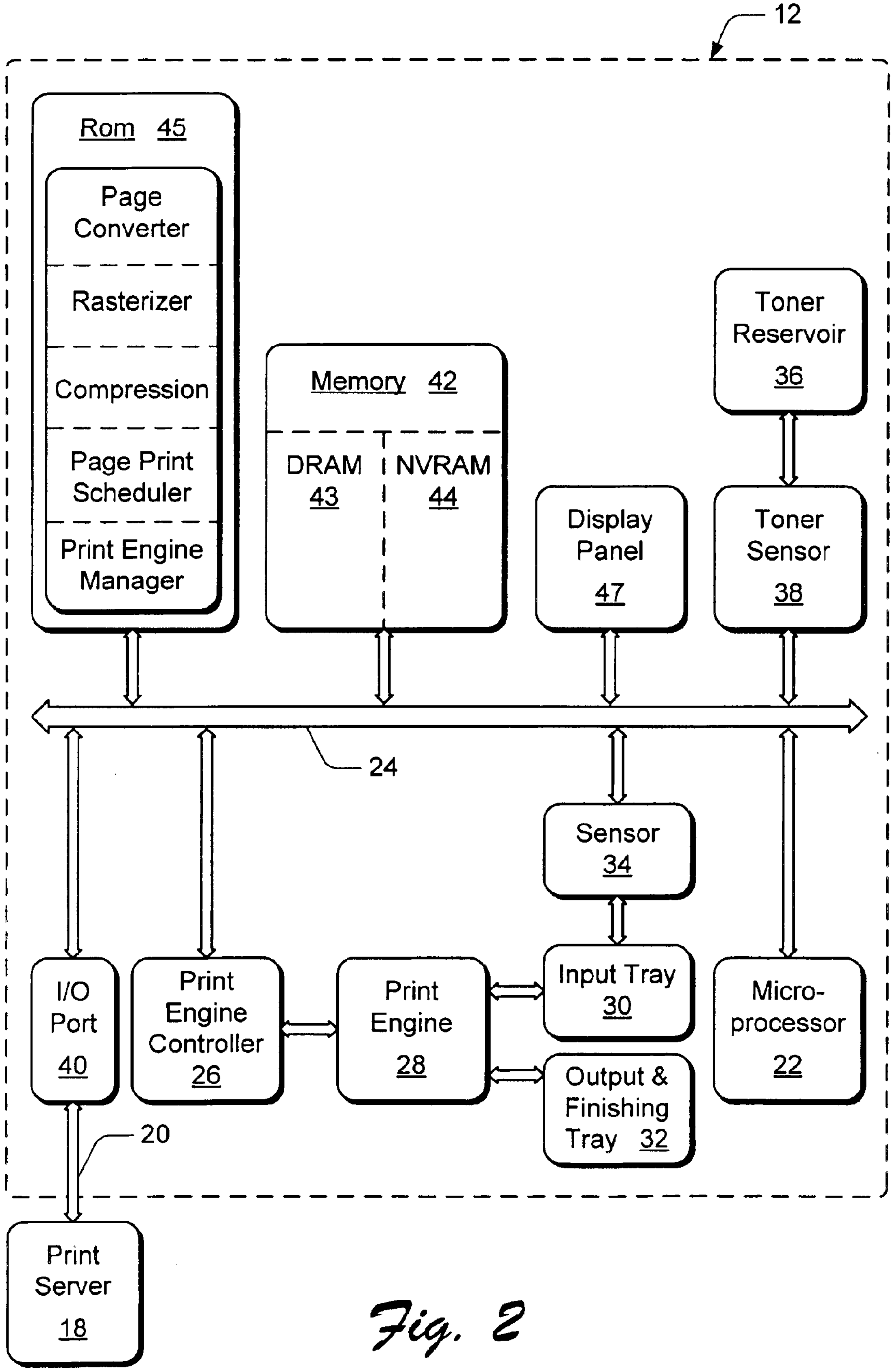
FIG. 2 is a block diagram of a laser printer shown in FIG. 1.

Referring now also to FIG. 2, a block diagram of a laser printer 12 suitable for use in computer network 10 is shown. Laser printer 12 is controlled by a microprocessor 22 which communicates with other elements of the system via bus 24. A print engine controller 26 and associated print engine 28 connect to bus 24 and provide the print output capability for the laser printer 12. A toner reservoir 36 contains a supply of marking material, i.e., toner, providing the toner to the print engine as required. A toner sensor 38 is coupled to the toner reservoir 36 and senses the amount of toner in the toner reservoir 36. Sheets of print media, such as paper, are pulled from input paper tray 30 into print engine 28 and directed to output tray or bin 32. A media level sensor 34 is coupled to input tray 30 and detects coarse granularity levels of print media in tray 30. For the purpose of this disclosure, only one toner reservoir 36 and one input paper tray are shown. However, as is well known in the art, most printers and other printing devices can include multiple toner or ink reservoirs; for example, a color printer may include at least three or four ink or toner reservoirs to provide the required color planes. Similarly, most printers and other printing devices include several print media supply trays to provide a user a choice of print media without the necessity of reloading a single media tray each time it is desired to use a different print media.

An input/output port 40 provides communications via LAN 20 between the laser printer 12 and the print server 18. Print server 18 includes one or more printer drivers (not shown) which provides page descriptions (i.e., raster data) and a page count (i.e., the number of pages) to the laser printer 12 for print jobs to be processed by the laser printer. A memory module 42 provides dynamic random access memory (DRAM) 43 which serves as a main memory for the laser printer for storing and processing a print job data stream received from the print server 18. Memory module 42 also provides non-volatile random access memory (NVRAM) 44, such as magnetic memory, for example, for long term storage and accumulation of printer statistics and other historical data such as toner usage over the laser printer 12 lifetime, for example. A read only memory (ROM) 45 holds firmware which controls the microprocessor 22 which controls the operation of the microprocessor 22 and the laser printer 12. A display panel 47 provides visual indication to a user of the condition or status of various printer parameters and supplies, "ready", error codes, toner low, or out of paper, for example.

The code procedures stored in ROM 45 include a page converter, rasterizer, compression code, page print scheduler and print engine manager. The page converter firmware converts a page description received from the print server 18 to a display command list, with each display command defining an object to be printed on the page. The rasterizer firmware converts each display command to an appropriate bit map (rasterized strip) and distributes the bit map to DRAM 43 for holding the rasterized strips. The rasterized strips are passed to print engine 28 by print engine controller 26, thereby enabling the generation of an image (i.e., text, graphics etc.). The page print scheduler controls the sequencing and transferring of page strips to the print engine controller 26. The print engine manager controls the operation of the print engine controller 26 and, in turn, print engine 28.

Figure 3:
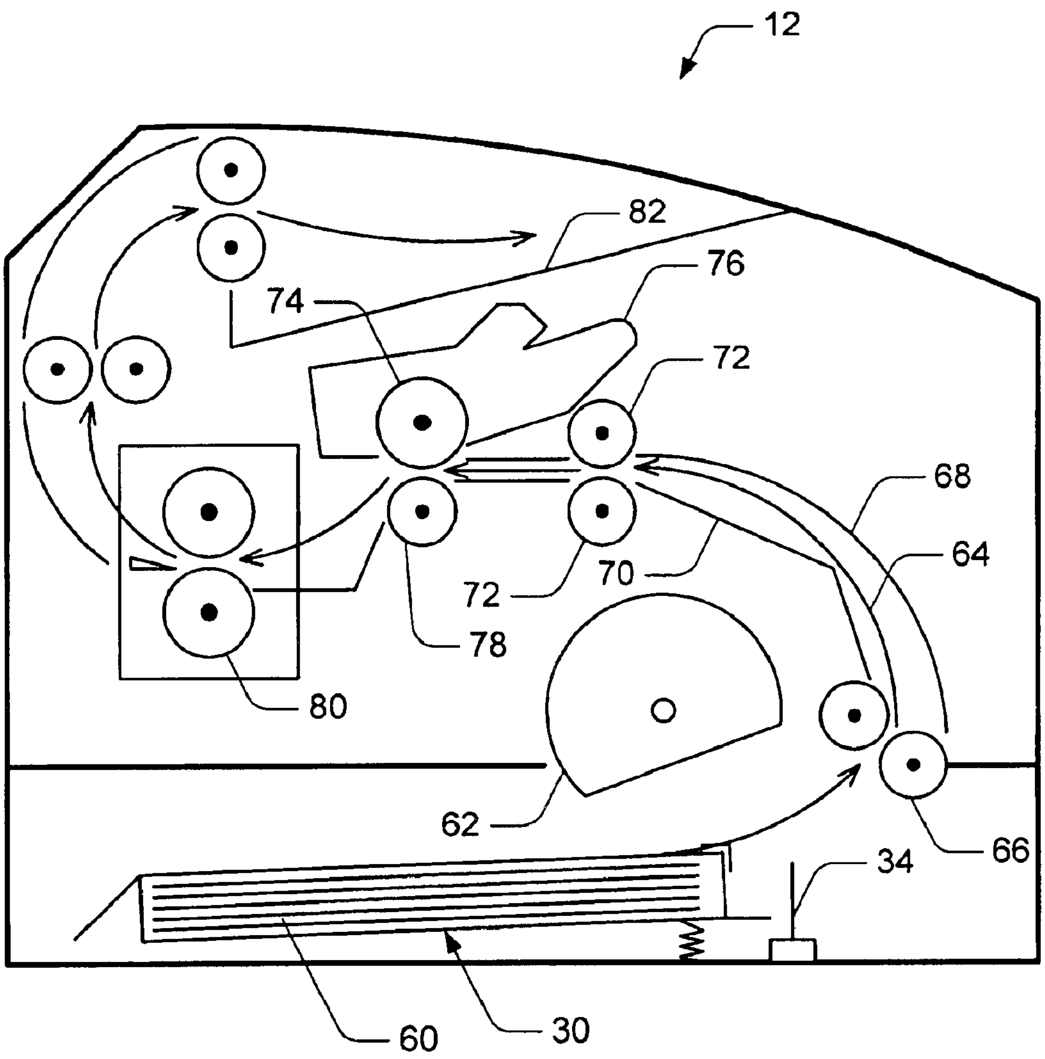
FIG. 3 is a schematic diagram of the laser printer shown in FIG. 2.

Referring now also to FIG. 3, a schematic block diagram of a laser printer 12 of FIG. 1 is shown. Input paper tray 30 holds sheets of print media 60. Feed roller 62 picks top sheet 64 from media stack 60 in input tray 30 and advances it to a pair of transport rollers 66. Transport rollers 66 further advance sheet 64 through paper guides 68 and 70 toward registration rollers 72. Registration rollers 72 advance paper sheet 64 to the photoconductive drum 74 (of toner cartridge 76) and transfer roller 78 where toner is applied as is conventional in the art. Sheet 64 then moves through heated fuser rollers 80 and toward an output paper bin 82. Media level sensor 34 is coupled to input tray 30 and detects levels of media in input tray 30.

With continuing reference to FIG. 1, in a conventional computer or printer network, a print job may be transmitted form a host or client computer 14, 16 to a print server 18. The print server 18, then, based on the print job requirements and other factors, determines an appropriate printer 12 and sends the print job to the selected printer, such as a laser printer 12, for example. At the printer 12, the print job is handled as discussed above to complete the print job and generate a printed output. According to the principles of the present invention, the print server 18 is adapted to calculate the amount of marking material, toner, for example, required to actually print the print job. In a preferred embodiment, calculation of the amount of marking material, such as toner, required to print a print job involves counting the number of image elements (pels) defining the print job and multiplying a known amount of marking material required to print an individual image element by the number of image elements contained in the print job. According to the present invention, the print server 18 includes a calculation module 17 which implements logic that converts the print data from a print job to raster data (i.e., a bit map) and then counts the image elements or pels contained in the print job. Using the amount of toner required to print an individual pel, the total amount of toner required to print an image is calculated from the pel count. The amount of toner required to print an individual pel may be determined by several known methods, for example, many printers include the capability to maintain a history of total number of pels printed versus total amount of toner used over all or selected periods of a printer lifetime. Additionally, as is known in the art, other methods of calculating the amount of marking material required to print a print job may be utilized in the present invention. For example, the amount of marking material required to cover 100 percent of a page is determined; then for each page of a print job, the percentage coverage is determined and multiplied by the amount of marking material required for 100 percent coverage. To minimize or prevent interrupting or delaying the print job, a copy of the print data is made and the toner calculation is completed as a separate task in the background while the print server continues to process the print job and send it on to a printer 12.

In another preferred embodiment of the invention, the client or host computer 14, 16 includes a format conversion module implementing software which converts a print job to a universal file format which preserves all fonts, formatting, colors, graphics, etc of the source document, such as Portable Document Format ("PDF"), for example. The print job PDF file is then transmitted from the host computer 14, 16 to the print server 18. At the print server 18, a copy of the print job PDF file is made. As described above, the calculation module 17 converts the print data from the PDF file to raster data and counts the pels to calculate the total amount of toner required to print the image or document. The print server 18 also includes a file conversion module 19 which implements a universal file format reader application in conjunction with the appropriate printer 12 driver (not shown) to convert the print job PDF file to the proper page description language ("PDL") for the selected printer 12. As discussed above, making a copy of the print job PDF file and calculating the amount of toner required as a separate task allows the print server 18 to process the print job and send it on to the printer 12 with minimum interruption or delay. Use of a universal file format for the print job allows calculation of the amount of toner required to be printer independent and minimizes the need to update the calculation module 17 application whenever the PDL for a particular printer 12 is modified.

Figure 4:
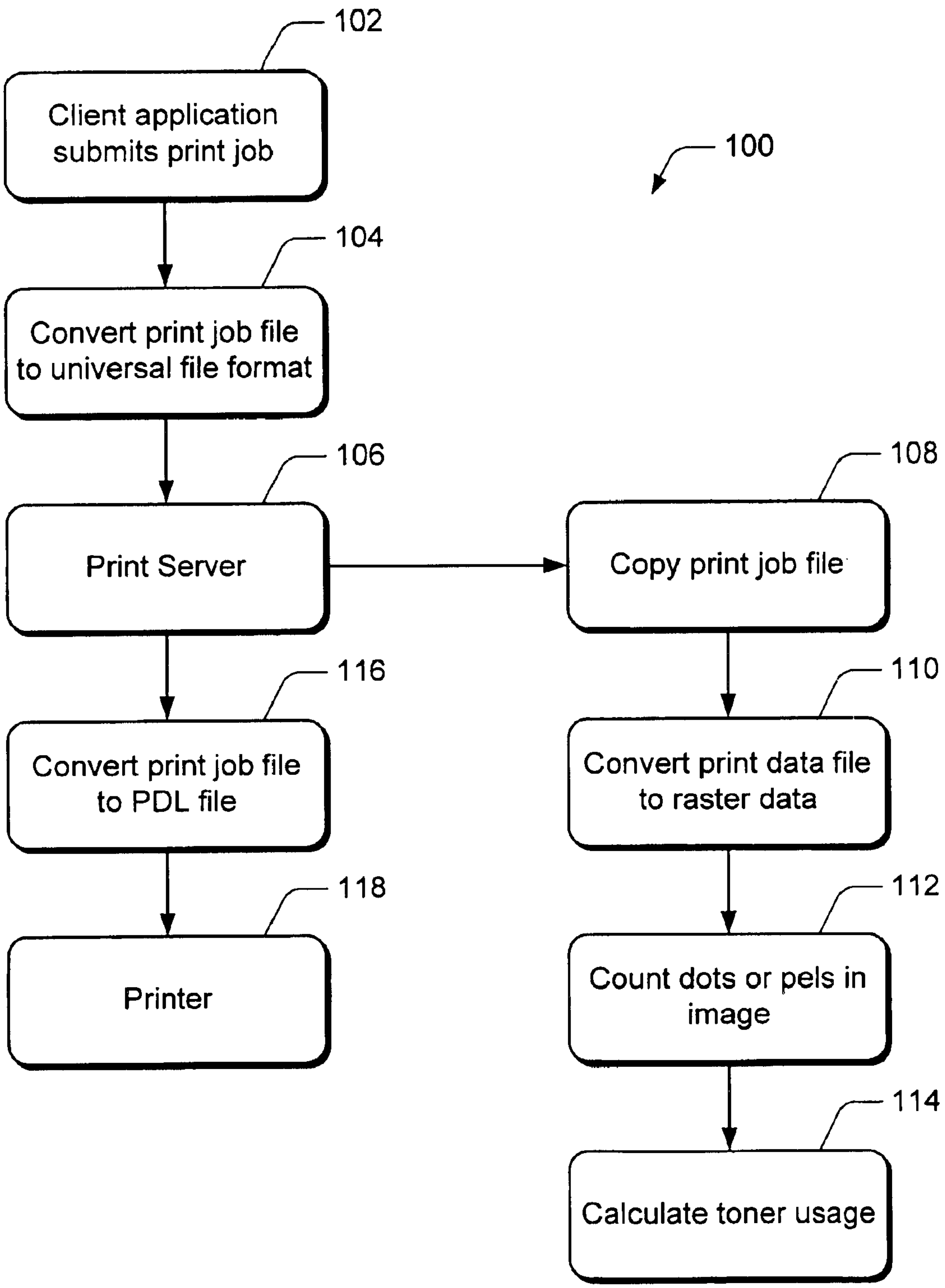
FIG. 4 is a flow chart depicting a preferred method of calculating the marking material required to print an image or document according to the principles of the present invention.

Referring now also to FIG. 4, a flow chart depicting a preferred method of calculating the marking material required to print an image or document according to the principles of the present invention is shown. The process 100 allows a print job to be completed without significant interruptions or delays while also calculating the amount of marking material, such as toner, required to print the image or document. Process 100 begins at step 102 when a user at a client computer 14 submits a print job, such as a document drafted in a word processing application, for example. Submission of a print job includes the image data stream and all control instructions directing how the document is to be printed. Prior to transmission to the print server 18, the print job is converted at step 104 to a universal file format, such as a PDF file for this example, using PDF conversion software application 13, 15, for example. At the print server 18, the handling of the print job processes as two separate processes. The print job PDF file is copied at step 108, and the toner calculation process proceeds as a separate task running in the server background. At step 110, PDF file print data is converted to raster data. The dots or pels in the image bit map thus generated are counted at step 112 and multiplied times the amount of toner required to print an individual pel to calculate the total amount of toner required to print the document image at step 114. Returning to step 106, the print server 18 continues to process the submitted print job. At step 116, the print job PDF file is converted to a PDL file using a universal file format reader, such as a PDF reader application, for example, in conjunction with an appropriate printer driver and sent on to a selected printer 12 at step 118.

In addition to the foregoing, the logic of the present invention can be implemented in hardware, software, firmware, or a combination thereof. In the preferred embodiment(s), the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate logic gates, a programmable gate arrays(s) (PGA), a field programmable gate array (FPGA), etc.

The logic which comprises an ordered listing of executable instructions for implementing logical functions can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any means that can contain, store, communicate, propagate, or transport the program for use by or in connection with the instruction execution system, apparatus, or device. The computer-readable medium can be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM)(magnetic), a read-only memory (ROM)(magnetic), an erasable programmable-read-only memory (EPROM or Flash memory), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

While having described and illustrated the principles of the present invention with reference to various preferred embodiments and alternatives, it will be apparent to those familiar with the art that the invention can be further modified in arrangement and detail without departing from those principles. Accordingly, it is understood that the present invention includes all such modifications that come within the terms of the following claims and equivalents thereof.

What is claimed:

1. In a computer network including a host computer, a print server and at least one image-forming device that utilizes a marking material to create images on a print media, a method for calculating an amount of the marking material for a print job, the method comprising:

converting the print job to a universal format file;

transmitting the universal format file to a print server;

copying the universal format file to generate a copied file; and as a first task:

converting the universal format file to a page description language (PDL) file;

processing the PDL file including at least selecting an image-forming device for the print job;

transmitting the PDL file to the selected image-forming device to print the print job; and as a second task, separate from the first task:

converting the copied file of the universal format file to raster data;

counting the number of image elements corresponding to the print job contained in the raster data; and calculating the amount of the marking material for the print job based on a predetermined amount of marking material for printing an individual image element.

2. The method of claim 1 wherein the first and second tasks are performed by the print server in parallel.

3. The method of claim 1 wherein the second task is performed by the print server in a background process of the print server.

4. The method of claim 1 wherein the at least one image-forming device is a laser printer, and wherein the marking material comprises toner for use in the laser printer.

5. The method of claim 1 wherein the at least one image-forming device is an ink jet printer, and wherein the marking material comprises ink for use in the ink jet printer.

* * * * *